G. E. COPPEN.
Transplanters.
No. 156,280. Patented Oct. 27, 1874.
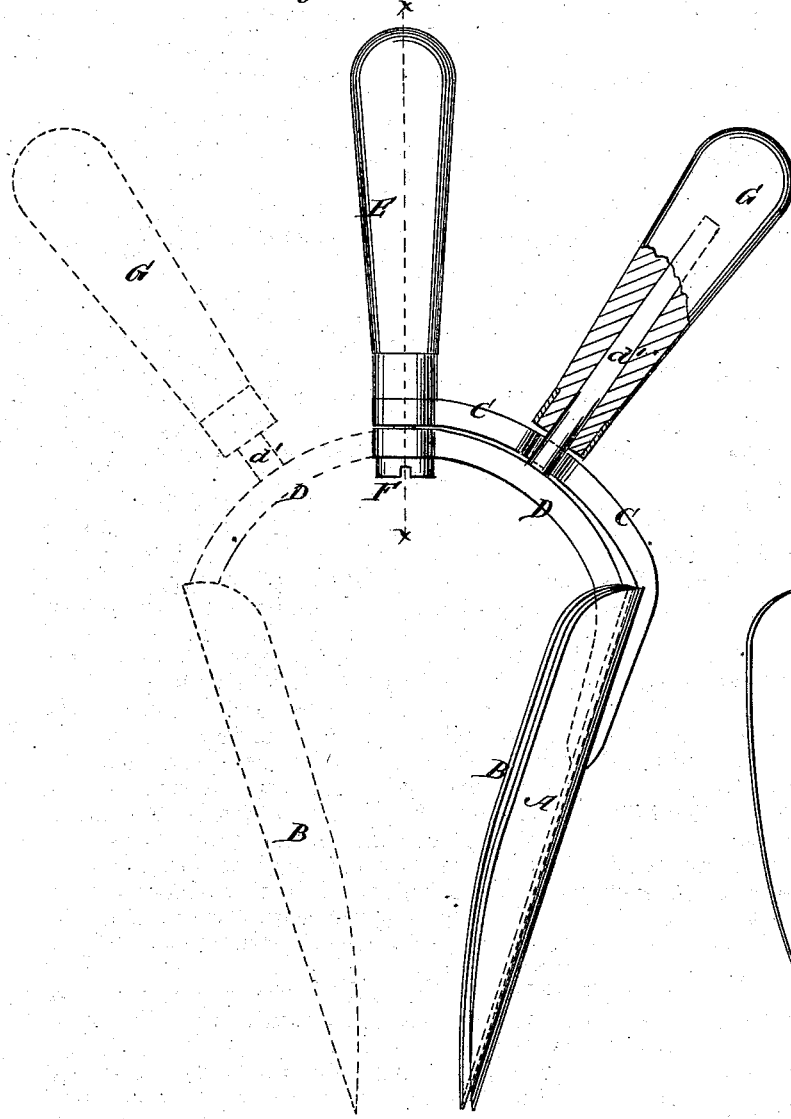
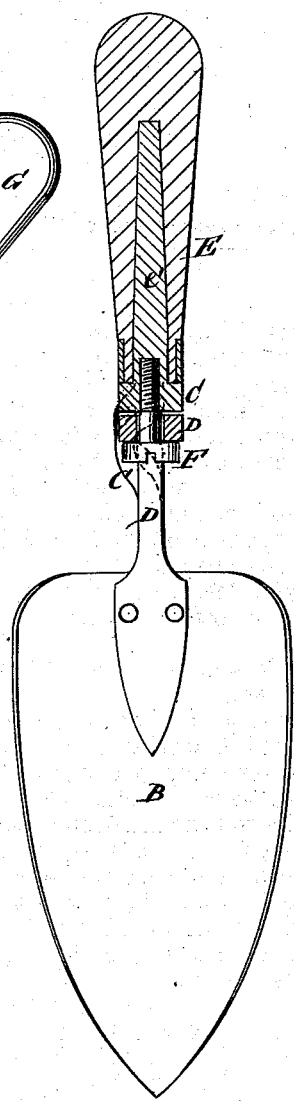

UNITED STATES PATENT OFFICE.

GEORGE E. COPPEN, OF NEW HARMONY, INDIANA.

IMPROVEMENT IN TRANSPLANTERS.

Specification forming part of Letters Patent No. 156,280, dated October 27, 1874; application filed July 18, 1874.

*To all whom it may concern:*

Be it known that I, GEORGE E. COPPEN, of New Harmony, in the county of Posey and State of Indiana, have invented a new and useful Improvement in Transplanter, of which the following is a specification:

Figure 1 is a side view of my improved transplanter closed, and showing in dotted lines the position of the movable blade and handle when opened. Fig. 2 is a front view of the same closed, the stationary handle being shown in section through the dotted line $x\ x$, Fig. 1.

Similar letters of reference indicate corresponding parts.

My invention has for its object to furnish an improved transplanter or double-bladed trowel for removing plants from the ground and setting them in another place without disturbing the soil around their roots.

The invention consists in the combination of two blades, one of which is swiveled in such manner as to adapt either or both to move in a circle, and both provided with handles, arranged as hereinafter described.

A represents the outer blade, and B the inner blade, of the transplanter, which blades are securely attached to the shanks C and D, respectively. The shank C of the outer blade A is curved forward, and has a tong, $c'$, formed upon it to enter the handle E, to which it is secured by any of the ordinary means. The shank D of the inner blade B is curved inward to fit upon the inner side of the shank C, and has a hole formed through its end to receive the screw F, which is screwed into a screw-hole formed in the end of the shank C, and extending into the tong $c'$, as shown in Fig. 2, so as to secure and pivot the shank D to the shank C. Upon the middle part of one side of the shank C is formed a recess or bend to receive the tong $d'$, formed upon the outer side of the middle part of the shank D, and to which is attached a handle, G.

In using the device the blades A B are brought together into the position shown in Fig. 2, and in full lines in Fig. 1. The two blades are then thrust into the ground, and the handles E G are operated to force one or the other of the blades through the ground around the roots of the plants, bringing the two blades directly opposite each other, and upon the opposite sides of the roots of the plants. The instrument is then raised from the ground, taking the plant with it, and holding the soil undisturbed around the roots of the plant. The plant may then be reset in the desired place, the blades turned back into their former position, and the instrument removed, the plant being thus transplanted without disturbing in the least the soil about its roots, and consequently without checking its growth.

Having thus described my invention, I claim as new and desire to secure by Letters Patent—

The combination, with the blade A, attached to handle E by shank C, of the blade B, pivoted or swiveled to the same by means of its arm D, and provided with a handle, G, as shown and described, to operate as specified.

GEORGE E. COPPEN.

Witnesses:
   GEORGE W. CALCROFT,
   WM. F. LICHTENBERGER.